United States Patent
Bachmann et al.

(10) Patent No.: US 6,540,213 B2
(45) Date of Patent: Apr. 1, 2003

(54) COLUMN COMPRISING A BASE BETWEEN FILLER BODY SECTIONS

(75) Inventors: Christian Bachmann, Ellikon (CH); Emil Fehr, Berg am Irchel (CH); Adrian Faust, Balterswil (CH)

(73) Assignee: Sulzer Chemtech AG, Winterthur (CH)

( * ) Notice: Subject to any disclaimer, the term of this patent is extended or adjusted under 35 U.S.C. 154(b) by 0 days.

(21) Appl. No.: 09/841,785

(22) Filed: Apr. 24, 2001

(65) Prior Publication Data

US 2001/0038155 A1 Nov. 8, 2001

(30) Foreign Application Priority Data

May 8, 2000 (EP) .............................................. 00810388

(51) Int. Cl.$^7$ ................................................ B01F 3/04
(52) U.S. Cl. ......................................... 261/97; 261/110
(58) Field of Search ............................ 261/97, 98, 103, 261/106, 110, DIG. 44

(56) References Cited

U.S. PATENT DOCUMENTS

| | | | | |
|---|---|---|---|---|
| 4,264,538 A | * | 4/1981 | Moore et al. .................. | 261/97 |
| 4,476,069 A | * | 10/1984 | Harper et al. .................. | 261/97 |
| 4,689,183 A | * | 8/1987 | Helms et al. .................. | 261/97 |
| 4,729,857 A | * | 3/1988 | Lee et al. ....................... | 261/97 |
| 4,816,191 A | * | 3/1989 | Berven et al. ................. | 261/97 |
| 4,909,967 A | * | 3/1990 | Binkley et al. ................ | 261/97 |
| 4,981,265 A | * | 1/1991 | Buhlmann .................... | 261/97 |
| 5,403,561 A | * | 4/1995 | Koros et al. ................... | 261/98 |
| 5,783,119 A | * | 7/1998 | Ulrich et al. ................. | 261/110 |
| 5,906,773 A | * | 5/1999 | Hausch et al. ................ | 261/97 |
| 6,293,526 B1 | * | 9/2001 | Fischer et al. ................ | 261/97 |

FOREIGN PATENT DOCUMENTS

| | | | | |
|---|---|---|---|---|
| DE | 2752391 | * | 5/1979 | ............... 261/110 |
| DE | 2945103 | * | 5/1981 | ............... 261/97 |
| DE | 3409524 | * | 9/1985 | ............... 261/97 |
| EP | 0282753 A1 | | 9/1988 | |
| EP | 0328786 | * | 8/1989 | ............... 261/97 |
| EP | 0367525 A1 | | 5/1990 | |
| EP | 1013324 A2 | | 6/2000 | |
| GB | 2163063 A | * | 2/1986 | ............... 261/97 |
| WO | WO 99/06130 | | 2/1999 | |

* cited by examiner

Primary Examiner—C. Scott Bushey
(74) Attorney, Agent, or Firm—Townsend and Townsend and Crew LLP

(57) ABSTRACT

The guide member for a liquid jet to be deflected allows a liquid after flowing out of a container to be deflected onto a target which is located below the container. The deflecting takes place by means of a shaped material plate which is arranged ahead of an outlet opening of the container and which reshapes and further conducts the jet in such a manner that the liquid is conveyed to the target at a lower end of the shaped material plate. At the location ahead of the outlet opening, where the liquid jet is incident onto the shaped material plate, a first and a second piece of surface of the material plate form a mouth region in which the first piece of surface deflects the liquid transversely with respect to the vertical, whereas the second piece of surface is provided as a catcher for squirts. The first piece of surface merges into a channel in which the liquid is guided downwards. In this the wall of the second piece of surface divides the channel off from the mouth region. In modified form the guide member can also be assembled from a plurality of shaped material plates.

14 Claims, 3 Drawing Sheets

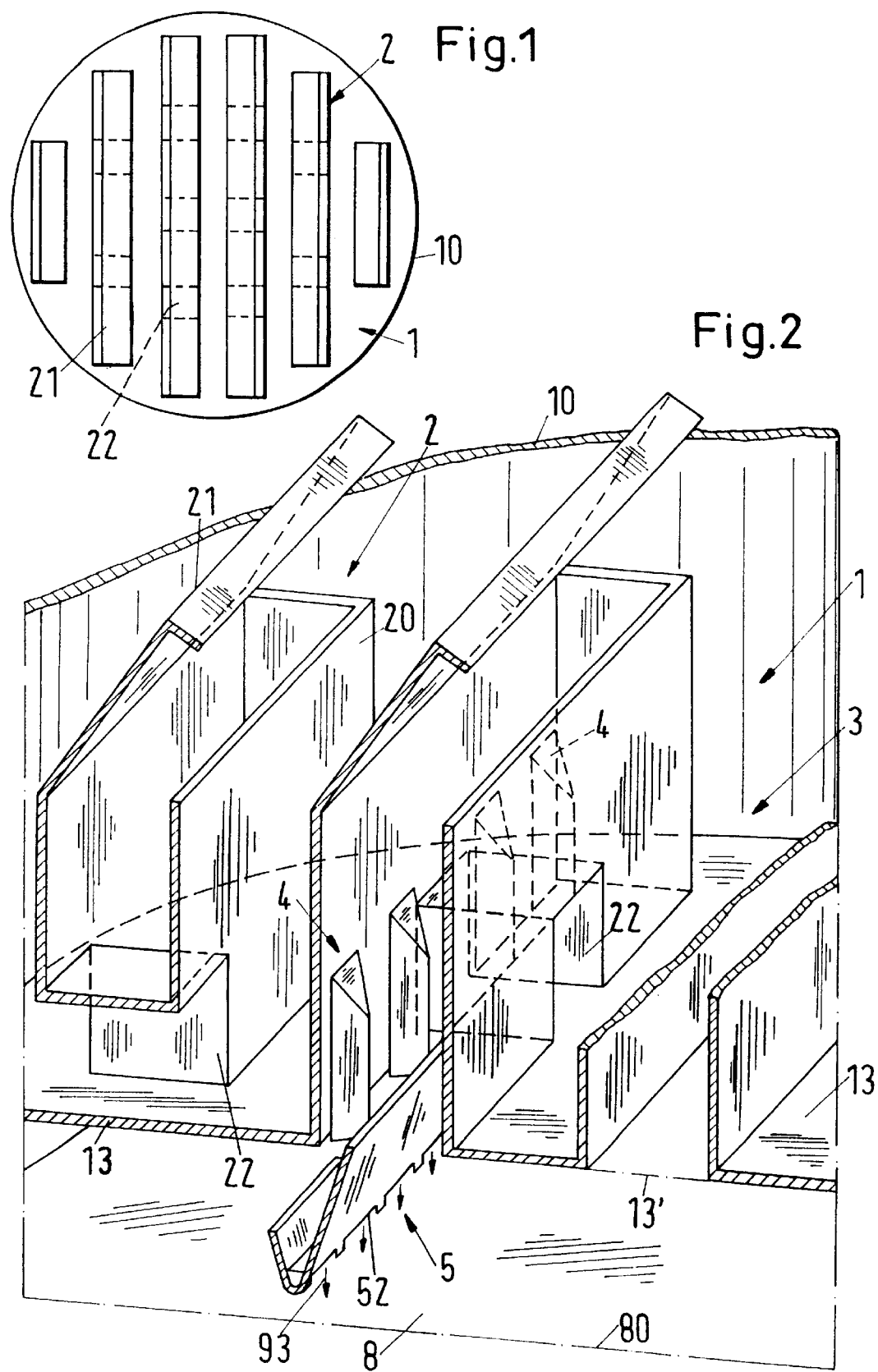

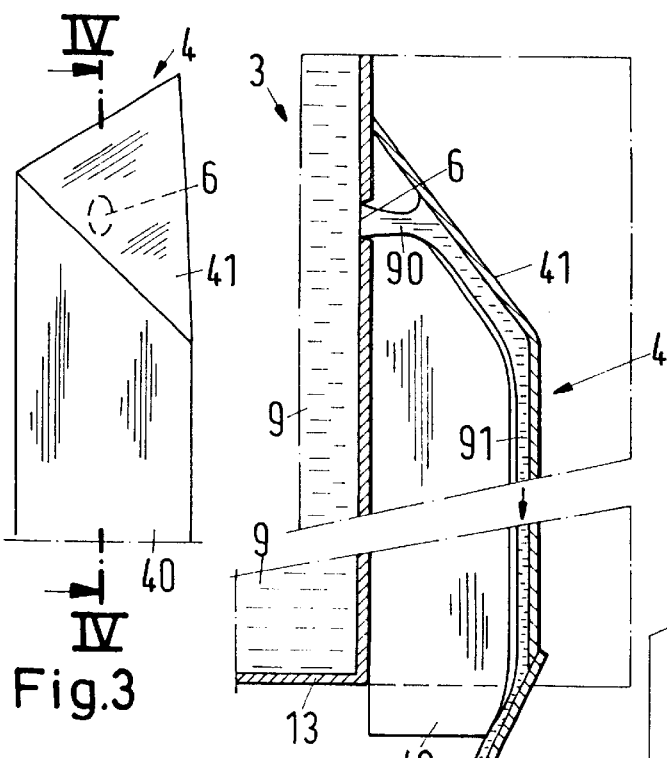
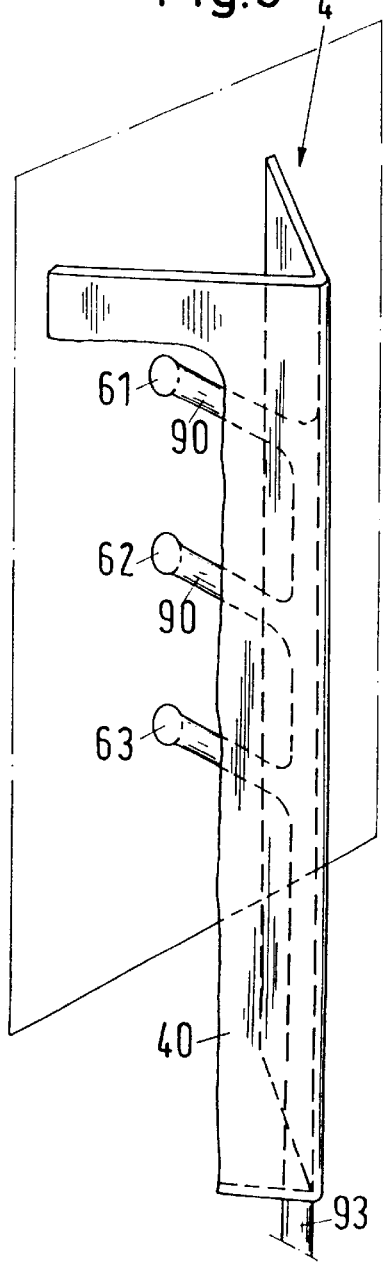
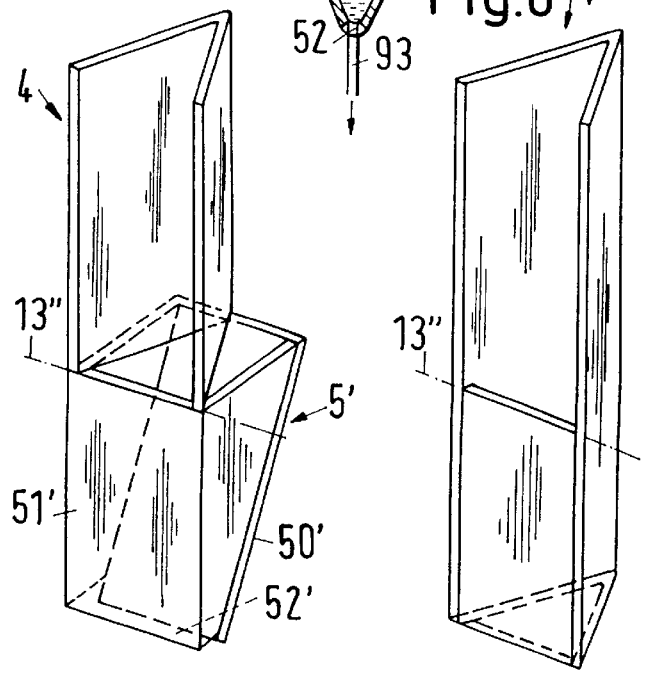

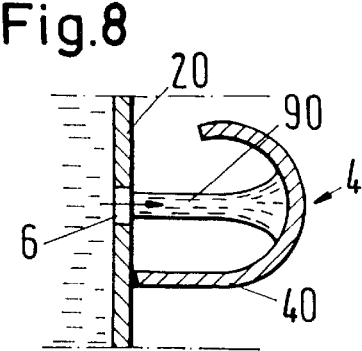
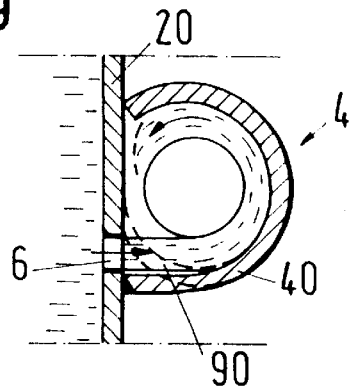
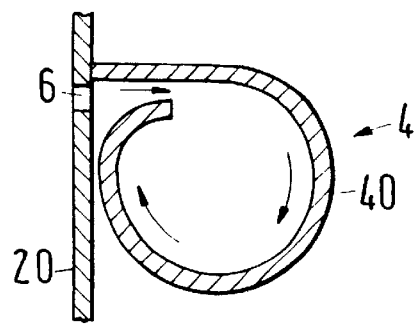
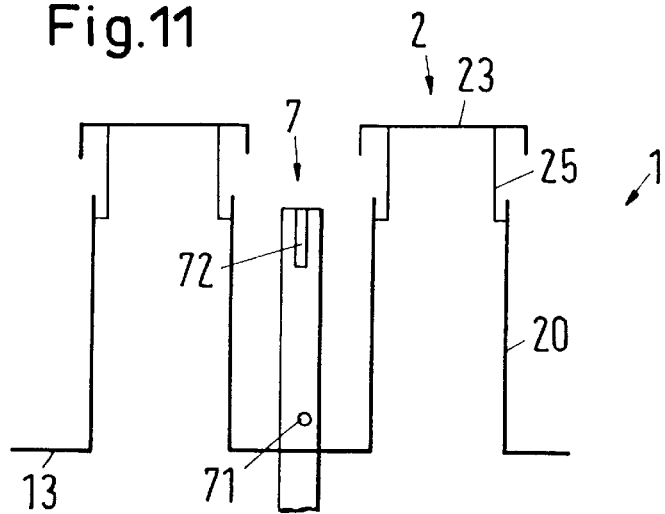
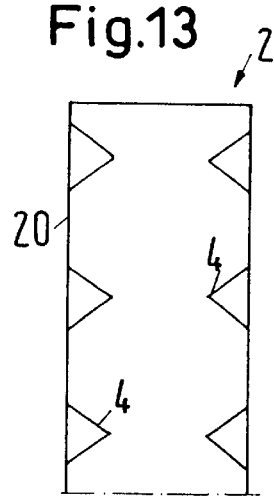
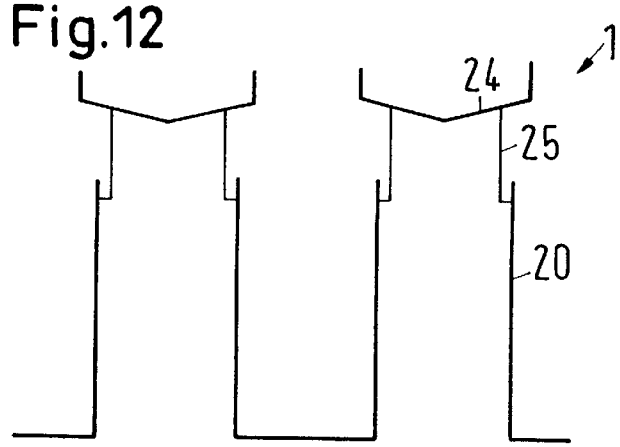

COLUMN COMPRISING A BASE BETWEEN FILLER BODY SECTIONS

BACKGROUND OF THE INVENTION

The invention relates to a column with a base between filler body sections and to a method for operating the column.

Column installations are known which, as flue base collectors, have the function of liquid distributors at the same time. In an apparatus of this kind the distribution of the liquid takes place from a buffer chamber which is located between cylindrical or shaft-shaped gas flues and through a base surface which contains for example bottom holes. Instead of bottom holes, tubes are also used, which contain one or more lateral apertures (outlet openings for the liquid) above the base and which are formed as drainage tubes below the base for the protection of the liquid flowing off against the gas flow (carrying along of drops). Collector-distributor bases of this kind are particularly suitable when columns have to be designed for liquid loads which can vary within large ranges and/or when a liquid which contains contamination particles must be treated in a column. The construction of a collector-distributor base with tubes instead of bottom holes is however very complicated and expensive since a large number of tubes must be welded into the base and the tubes must be tightly fitted in.

In order that a liquid distribution is uniform, the bottom holes or tubes must be arranged in a pattern for which these outflow locations have a largely constant distribution density over the entire column cross-section. In known collector-distributor bases this requirement has as a result that the gas flues must have relatively small cross-sectional areas. Therefore many flues must be welded in tightly into the base, which—as already for the tubes—represents a large cost and complexity.

SUMMARY OF THE INVENTION

It is an object of the invention to create a column which has collector-distributor bases which are arranged between filler body sections and which can be operated with a liquid load which varies within a large range and/or with contaminated liquids. In addition the manufacturing expenditure for the named bases should be lower than for the bases of known columns.

The column contains a base between an upper and a lower filler body section. With this base, liquid is collected from the upper section in a buffer chamber and collected liquid is distributed onto the lower section. Flues serve as passages for a gas transport through the buffer chamber. Outlet openings of the buffer chamber are arranged in vertical walls of the flues and guide members for the liquid to be distributed are arranged ahead of the outlet openings. Each outlet opening and its associated guide member are formed in such a manner that the liquid is incident onto a deflection surface of the guide member as a largely free jet, unimpeded by a back pressure. The flue cross-sectional area which is available for the gas transport is decreased by the guide members by at most 20%.

The guide members of the column in accordance with the invention can be far more economically mounted in comparison with the above-named tubes, since no tight welding seams are required. At the same time the flue cross-sections can be made larger, which likewise leads to a cost reduction.

In the following the invention will be explained with reference to the drawings.

BRIEF DESCRIPTION OF THE DRAWINGS

FIG. 1 is a cross-section through a column in accordance with the invention with a plan view of a collector-distributor base, FIG. 2 shows part of a collector-distributor base of the same type as in FIG. 1, illustrated in an oblique view, FIG. 3 shows the upper part of a guide member of the base of a column in accordance with the invention, FIG. 4 is a longitudinal section through the entire guide member of FIG. 3, namely a section in accordance with line IV—IV in FIG. 3, FIG. 5 shows an angular guide member which is arranged ahead of three outlet openings, FIGS. 6, 7 show two modifications of the guide member of FIG. 5, FIGS. 8–10 are cross-sections through further embodiments of the guide member, FIGS. 11, 12 are schematic illustrations of gas flues with known hat shapes, and FIG. 13 is a horizontal cross-section through a shaft-shaped flue of a column in accordance with the invention.

DESCRIPTION OF THE PREFERRED EMBODIMENTS

The cross-section through a column in FIG. 1 shows as a plan view a collector-distributor base 1 which is arranged within a column wall 10 and which has shaft-like gas flues 2. The oblique view of FIG. 2 illustrates in detail gas flues 2 of this kind which are covered over with lamella-like screens 21 against the entry of liquid. These screens 21 are arranged oppositely with respect to FIG. 1: A gas channel between the screen 21 and a side wall 20 of the flue 2 is open toward the column center instead of toward the periphery. The flues 2 are formed as stiffening constructional elements which stabilize the base 1 against a bending through. For this stabilizing the flues 2 are formed as lamella collectors in their upper region by means of the screens 21, with the screens 21 connecting a circular edge region of the column along parallel chords in the form of through-going wall surfaces.

The base 1 lies between an upper, non-illustrated filler body section and a lower filler body section 8. The filler bodies can be ordered packings of filler body elements or filler body elements in bulk. With the base 1, liquid 9 (see FIG. 4) is collected from the upper filler body section in a buffer chamber 3 and collected liquid 9 is distributed onto the lower section 8. A base surface 13 of the buffer chamber 3 contains no bottom holes. In the illustration of FIG. 2 a vertical section plane forms two parallel section lines, namely a lower edge 13' of the base surface 13 which is drawn in chain-dotted lines and a line 80 which is drawn in chain-dotted lines and which lies on the upper edge surface of the filler body section 8.

In the column a gas is conducted in counter-flow to the liquid 9. The flues 2 serve as passages for the gas transport through the buffer chamber 3. The entire cross-sectional area of the flues 2 amounts to a maximum of about 40% in relation to the column cross-section. Transverse channels 22, which form tunnel-like passages through the flues 2, enable a rapid hydrodynamic equalization in the buffer chamber 3 if the level of the liquid 9 is not equally high everywhere.

Outlet openings 6—see FIGS. 4 and 5—are arranged in the vertical walls 20 of the flues 2, through which the liquid 9 to be distributed can emerge from the buffer chamber 3 into guide members 4 ahead of the outlet openings 6.

Each outlet opening 6 and its associated guide member 4 are designed in such a manner that the liquid can be incident onto a deflection surface 41 of the guide member 4 as a largely free jet 90 unimpeded by a back pressure. The horizontal cross-sectional areas of the guide members 4 must be as small as possible in order that the flue cross-sectional area which is available for the gas transport is as large as possible. In accordance with the invention the guide members 4 decrease the flue cross-sectional area by at most 20%.

The uppermost or only outlet opening 6 of a guide member 4 can be arranged ahead of an inclined surface piece 41 of the guide member 4 (FIG. 4) in order to keep a back pressure low. Instead of a planar surface piece 41 a curved one can also be provided. Through the surface piece 41, onto which the liquid jet 90 is incident at an angle of at most 60°, the liquid 9 is deflected downward and conducted as a passage flow 91 against the lower filler body section 8, where it emerges from the guide member 4 as a jet 93.

The guide member 4 form s a vertical channel in the flue 2 between two planar wall sections 40 in which the flowing liquid 91 has a substantially isodiametrical cross-section as a result of the channel shape, namely such that the distances are in each case largely equally great for all pairs of diametrically arranged edge points of the cross-section. The channel is in particular formed in the shape of an angle, with the channel cross-section preferably having the shape of an isosceles, in particular of an equilateral triangle and with the base of this triangle lying on the flue wall 20. The cross-section of the liquid 91 which flows in the channel has for example approximately the shape of an equilateral triangle and can thus be considered as substantially isodiametrical.

As FIG. 5 illustrates, a plurality of outlet openings 61, 62, 63 can be associated with the guide member 4; the former lie on a vertical line. The individual outlet openings 61, 62, 63 are smaller than if only a single outlet opening with equal flow-through capacity were present. Therefore the problem with a possible back pressure through the deflecting guide member 4 is less pronounced. The cross-section of the guide member 4 can be chosen smaller and an inclined or curved deflection surface 41 can be dispensed with. A guide member 4 with two or more outlet openings 61, 62, 63 is provided in particular for large liquid loading ranges.

In FIGS. 2 or 4 respectively the guide member 4 merges into a distributor region 5 in which two wall pieces 50 and 51 which stand at an angle to one another cause a linear propagation of the liquid parallel to the longitudinal extent of the flues 2. At the apex of the angle which is formed by the wall pieces 50 and 51 there are narrow intermediate webs and slit-like passage openings 52, from which a completely or largely closed liquid curtain 93 emerges.

Below the buffer chamber 3 the guide member 4 can merge into a vertical channel or else an inclined channel (not shown), in which the flowing liquid continues to have a substantially isodiametrical cross-section as a result of the channel shape: see FIG. 6. The lower part of the guide member 4, which lies below the level 13'' of the base surface 13, can be an open channel or a channel which is covered over by a wall.

FIG. 7 shows a variant of the guide member 4 of FIGS. 2 and 4 with a distribution region 5'. In this exemplary embodiment the liquid 9 is distributed between two walls 50' and 51' over a gap-like outlet opening 52', the extent of which is limited to the width of the guide member 4.

FIG. 8 shows a guide member 4 with a semicircular channel. In FIGS. 9 and 10 guide members 4 are illustrated which in each case form a substantially cylindrical channel. In these embodiments the outlet openings 6 are arranged in such a manner that the emerging liquid jet 90 is incident at least approximately tangentially—without back pressure— onto the inner wall of the guide member 4. The channel which is formed by this guide member 4 is flowed through helically, with the pitch of the helical flow increasing with increasing fall height. With a flow shape of this kind the liquid 9 can be transported away very rapidly out of the interior of the flue 2.

Instead of the lamella-shaped screens 21 the covers of the flues 2 can also be formed of cap-like hats 23, FIG. 11, or channel-shaped hats 24, FIG. 12. The channel-shaped hats 24 are as a rule installed at an inclination. They are advantageously arranged to fall off alternatingly backwardly and forwardly respectively at an inclination, through which a mixing of the collected liquid 9 over the column cross-section sets in. The hats 23 and 24 respectively are seated on support bars 15 which are secured at the flue wall 20 at a height for which a gas outlet out of the flues 2 is sufficiently large. FIG. 11 shows that tube-like outflow locations 7 (with lateral outlet locations 71, 72), which supplement the outlet locations 6 in accordance with the invention in the flues 2, can also be arranged in the buffer chamber 3 between the flues 2 in order to obtain a greater density of outlet locations.

The outlet locations 6 in accordance with the invention in the flues 2 are for example, as is illustrated in FIG. 2, arranged only on one side of the interior of the flue. It is more advantageous, in order to increase the density of outflow locations, for them to be arranged on both sides of the flue 2, as is shown in FIG. 13 with the guide members 4.

In a method for operating a column in accordance with the invention a liquid is brought into contact with a gaseous phase in counter-flow to the latter and indeed in filler bodies which have the form of ordered packings or are provided in bulk. In this, in relation to the column cross-section the volume flow of the liquid can amount to a maximum of $L_{max}=100$ m$^3$/m$^2$ h and a minimum of $L_{min}=0.5$ m$^3$/m$^2$ h, with it being possible for the ratio of $L_{max}:L_{min}$, namely the loading range, to be 30:1.

What is claimed is:

1. Column comprising a base between an upper body section and a lower body section, the base including a buffer chamber having a base plate for collecting liquid from the upper body section and distributing the liquid onto the lower body section, upright walls defining flues extending through the base plate and the buffer chamber and serving as passages for a gas transport through the buffer chamber, outlet openings for the buffer chamber being arranged in the upright walls of the flues, and guide members including a deflection surface for the liquid to be distributed arranged inside the flues and proximate associated outlet openings so that liquid exiting through the outlet openings contacts and is diverted by the guide members.

2. Column in accordance with claim 1 wherein the guide member forms a vertical channel in the flue in which the flowing liquid has a substantially isodiametrical cross-section as a result of the channel shape and is shaped as an angle, the channel having a cross-section in the form of an isosceles triangle and with a base lying on the flue wall.

3. Column in accordance with claim 1 wherein the guide member forms a vertical or an inclined channel beneath the buffer chamber in which the liquid has a substantially isodiametrical cross-section as a result of the channel shape.

4. Column in accordance with claim 1 wherein two or more outlet openings are associated with the guide member which are vertically arranged one above the other.

5. Column in accordance with claim 1 wherein the guide member forms a substantially cylindrical channel with respect to which an outlet opening is arranged in such a manner that a liquid jet emerging from the outlet opening is at least approximately tangentially incident onto an inner channel wall and then flows through the channel in a helical manner.

6. Column in accordance with claim 1 wherein an uppermost outlet opening is arranged relative to an inclined or curved surface piece of the guide member so that the liquid is deflected downwardly and onto which the liquid jet is incident at an angle of at most 60°.

7. Column in accordance with claim 1 including tubular flow-off points arranged in the buffer chamber between the flues.

8. Column in accordance with claim 1 wherein the flues are formed as stiffening constructional elements which stabilize the base plate against bending.

9. Column in accordance with claim 8 wherein the flues are formed in their upper region as lamella collectors and lamella of the flues connect edge regions of the column as through-going wall surfaces.

10. Method of operating a column having a base between an upper filler body section and a lower filler body section, the base including a buffer chamber having a base plate for collecting liquid from the upper filler body section and distributing the liquid onto the lower filler body section, upright walls defining flues extending through the base plate and the buffer chamber and serving as passages for a gas transport through the buffer chamber, outlet openings for the buffer chamber being arranged in the upright walls of the flues, and guide members including a deflection surface for the liquid to be distributed arranged inside the flues and proximate associated outlet openings, the method comprising bringing the liquid in counter-flow into contact with a gaseous phase in filler bodies which have the form of ordered packings or which are provided in bulk; and flowing the liquid in relation to the column cross-section so that the liquid flow amounts to a maximum of $L_{max}=100$ m$^3$/m$^2$h and a minimum of $L_{min}=0.5$ m$^3$/m$^2$h.

11. A method according to claim 10 wherein the ratio of $L_{max}:L_{min}$ lies in the range up to 30:1.

12. Column according to claim 3 wherein the wall sections are arranged so that they cause a linear propagation of the liquid.

13. Column comprising a base between an upper body section and a lower body section, the base including a buffer chamber having a base plate for collecting liquid from the upper body section and distributing the liquid onto the lower body section, upright walls defining flues extending through the base plate and the buffer chamber and serving as passages for a gas transport through the buffer chamber, outlet openings for the buffer chamber being arranged in the upright walls of the flues, and guide members including a deflection surface for the liquid to be distributed arranged inside the flues and proximate associated outlet openings, each outlet opening and its associated guide member being formed so that the liquid is incident onto the deflection surface as a substantially free jet unimpeded by back pressure.

14. Column according to claim 13 wherein the guide members includes surfaces which face the outlet openings and which are obliquely inclined relative to an axis of the associated outlet openings.

* * * * *